US007015610B2

(12) United States Patent
Horng et al.

(10) Patent No.: US 7,015,610 B2
(45) Date of Patent: Mar. 21, 2006

(54) AXIAL TUBE ASSEMBLY FOR A MOTOR

(75) Inventors: Alex Horng, Kaohsiung (TW); Yin-Rong Hong, Kaohsiung (TW); Ching-Sheng Hong, Kaohsiung (TW)

(73) Assignee: Sunonwealth Electric Machine Industry Co., Ltd., Kaohsiung (TW)

( * ) Notice: Subject to any disclaimer, the term of this patent is extended or adjusted under 35 U.S.C. 154(b) by 31 days.

(21) Appl. No.: 10/677,219

(22) Filed: Oct. 3, 2003

(65) Prior Publication Data

US 2005/0046286 A1 Mar. 3, 2005

(30) Foreign Application Priority Data

Sep. 1, 2003 (TW) .............................. 92124143 A

(51) Int. Cl.
*H02K 5/16* (2006.01)
*H02K 7/08* (2006.01)

(52) U.S. Cl. .......................................... 310/90; 310/91

(58) Field of Classification Search ................. 310/90, 310/91, 67 R; 384/613, 609, 615, 536, 520; 360/98.07, 99.04, 99.08
See application file for complete search history.

(56) References Cited

U.S. PATENT DOCUMENTS

| | | | | |
|---|---|---|---|---|
| 4,737,673 | A * | 4/1988 | Wrobel | 310/90 |
| 5,650,678 | A * | 7/1997 | Yokozawa et al. | 310/90 |
| 6,271,611 | B1 * | 8/2001 | Taniguchi et al. | 310/89 |
| 6,563,243 | B1 * | 5/2003 | Obara et al. | 310/90 |

* cited by examiner

*Primary Examiner*—Tran Nguyen
(74) *Attorney, Agent, or Firm*—Bacon & Thomas, PLLC

(57) ABSTRACT

An axial tube assembly for a motor includes an axial tube and a sleeve mounted in the axial tube. The axial tube is securely mounted to a casing, and a stator is mounted to the axial tube. The axial tube includes at least one engaging member on an inner periphery thereof. The sleeve includes at least one engaging member engaged with the engaging member of the axial tube. When a bearing is mounted in the sleeve, the sleeve is tightly engaged with the axial tube such that the axial tube and the bearing exert forces to each other to thereby retain the axial tube and the bearing in place.

11 Claims, 14 Drawing Sheets

AXIAL TUBE ASSEMBLY FOR A MOTOR

BACKGROUND OF THE INVENTION

1. Field of the Invention

The present invention relates to an axial tube assembly for a motor. In particular, the present invention relates to an axial tube assembly for reliably positioning a bearing of a motor. The present invention also relates to a motor having such an axial tube assembly.

2. Description of Related Art

FIGS. 1 and 2 of the drawings illustrate a conventional motor including a casing 10, a bearing 20, a stator 30, a circuit board 31, and a rotor 40. The casing 10 includes an axial tube 11 integrally formed on a central portion of the casing 10. The axial tube 11 includes a stepped portion 11*a* on an inner periphery thereof and a plurality of longitudinal slits 11*b* in a top end thereof. The slits 11*b* allow the axial tube 11 to expand radially outward. After the bearing 20 is mounted into the axial tube 11, a retaining cap 11*c* is mounted to the stepped portion 11*a* to improve assembling reliability, and a shaft 41 of the rotor 40 is then extended through the retaining cap 11*c* and the bearing 20. Further, at least one rib 11*d* is formed on an outer periphery of the axial tube 11 for engaging with at least one groove 30*a* in a longitudinal hole of the stator 30 to provide a reliable positioning for the stator 30. Further the stator 30 includes a plurality of legs 30*b* engaged with the circuit board 30. After assembly, the retaining cap 11*c* urges the top end of the axial tube 11 to expand radially outward, thereby preventing the stator 30 from being disengaged from the axial tube 11.

The above-mentioned motor has a simple structure that is easy to assemble and that has a low manufacturing cost. However, the assembling reliability of the motor is low, as the retaining cap 11*c* is the only member for maintaining the positional relationships among the bearing 20, the stator 30, and the circuit board 31. Further, in a case that the axial tube 11 and the bearing 20 have a relatively large tolerance therebetween, the bearing 20 is apt to rotate together with the shaft 41 of the rotor 40. Further, coaxiality of the axial tube 11, the bearing 20, and the shaft 41 of the rotor 40 could not be achieved, as the bearing 20 is directly engaged in the axial tube 11 without any positioning assistance. As a result, the rotational stability is adversely affected, resulting in imbalanced rotation and generation of noise. Further, since there is no means for preventing the retaining cap 11*c* from being disengaged from the axial tube 11, the shaft 41 might shake and thus cause a retainer ring 20*a* mounted to a distal end of the shaft 41 to exert an axial force to the bearing 20 and the retaining cap 11*c,* causing disengagement of the bearing 20 and the retaining cap 11*c* from the axial tube 11. Further, a relatively large gap exists between the axial tube 11 and the rotor 40 such that dusts in the air current might enter and thus contaminate the lubricating oil in the bearing 20. The speed of the rotor 40 is thus lowered, and the life of the motor is shortened.

OBJECTS OF THE INVENTION

An object of the present invention is to provide an axial tube assembly for a motor for reliably positioning a bearing of the motor.

Another object of the present invention is to provide an axial tube assembly for a motor for reliably positioning a stator of the motor.

A further object of the present invention is to provide an axial tube assembly for a motor for prolonging the life of the bearing of the motor.

Still another object of the present invention is to provide an axial tube assembly for a motor for improving rotational stability of the rotor of the motor.

Yet another object of the present invention is to provide a motor having such an axial tube assembly.

SUMMARY OF THE INVENTION

In accordance with one aspect of the invention, an axial tube assembly for a motor is provided and includes an axial tube and a sleeve mounted in the axial tube. The axial tube is securely mounted to a casing, and a stator is mounted to the axial tube. The axial tube includes at least one first engaging member on an inner periphery thereof. The sleeve includes at least one second engaging member engaged with the first engaging member of the axial tube. When a bearing is mounted in the sleeve, the sleeve is tightly engaged with the axial tube such that the axial tube and the bearing exert forces to each other to thereby retain the axial tube and the bearing in place.

In accordance with another aspect of the invention, a motor is provided and includes a casing, an axial tube securely mounted to the casing, a stator mounted to the axial tube, a sleeve mounted in the axial tube, and a bearing mounted in the sleeve. The axial tube includes at least one first engaging member on an inner periphery thereof. The sleeve includes at least one second engaging member engaged with the first engaging member of the axial tube. The sleeve is tightly engaged with the axial tube such that the axial tube and the bearing exert forces to each other to thereby retain the axial tube and the bearing in place.

Other objects, advantages and novel features of this invention will become more apparent from the following detailed description when taken in conjunction with the accompanying drawings.

DETAILED DESCRIPTION OF THE PREFERRED EMBODIMENTS

Figure 1:
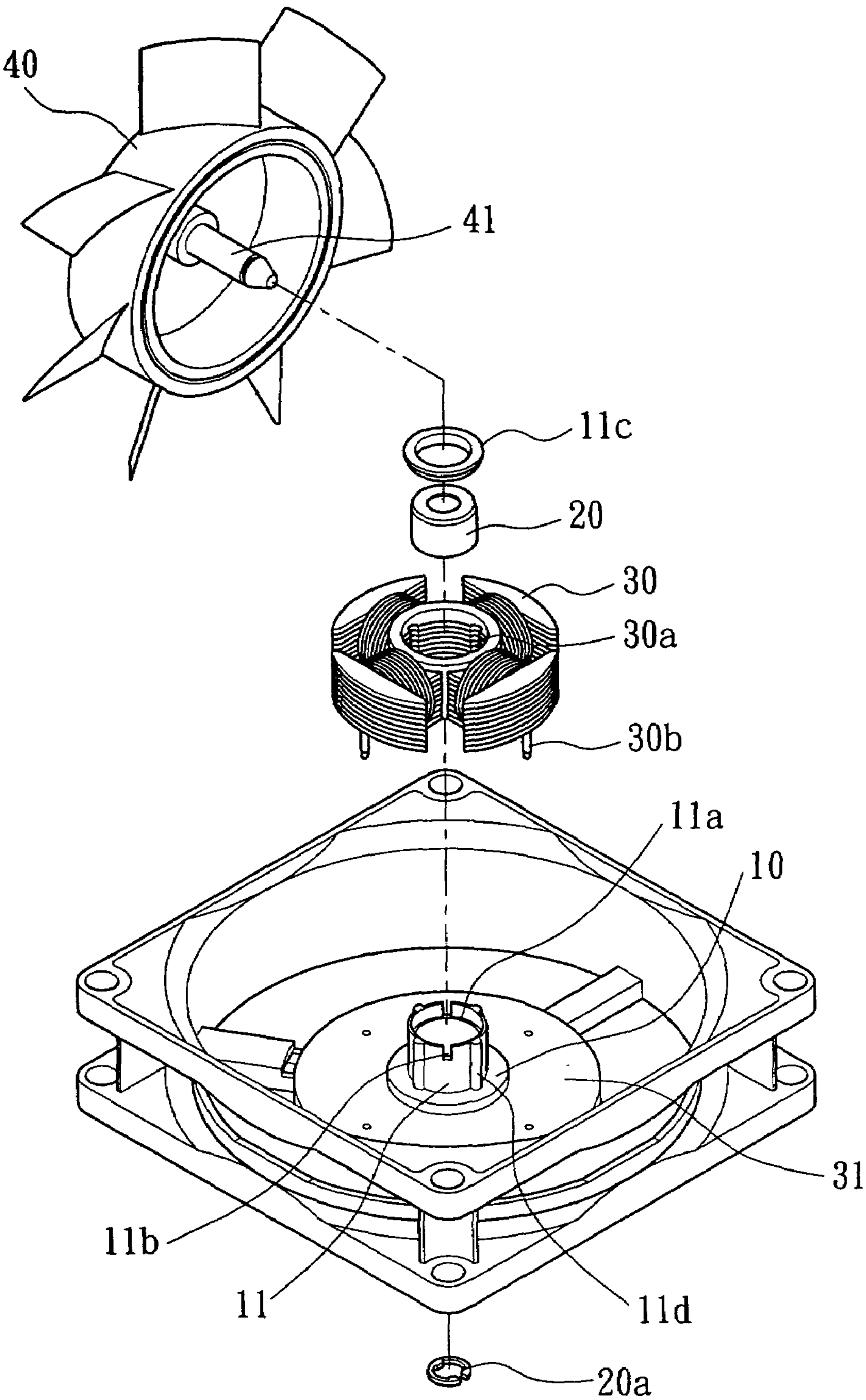
FIG. 1 is an exploded perspective view of a conventional motor.
Figure 2:
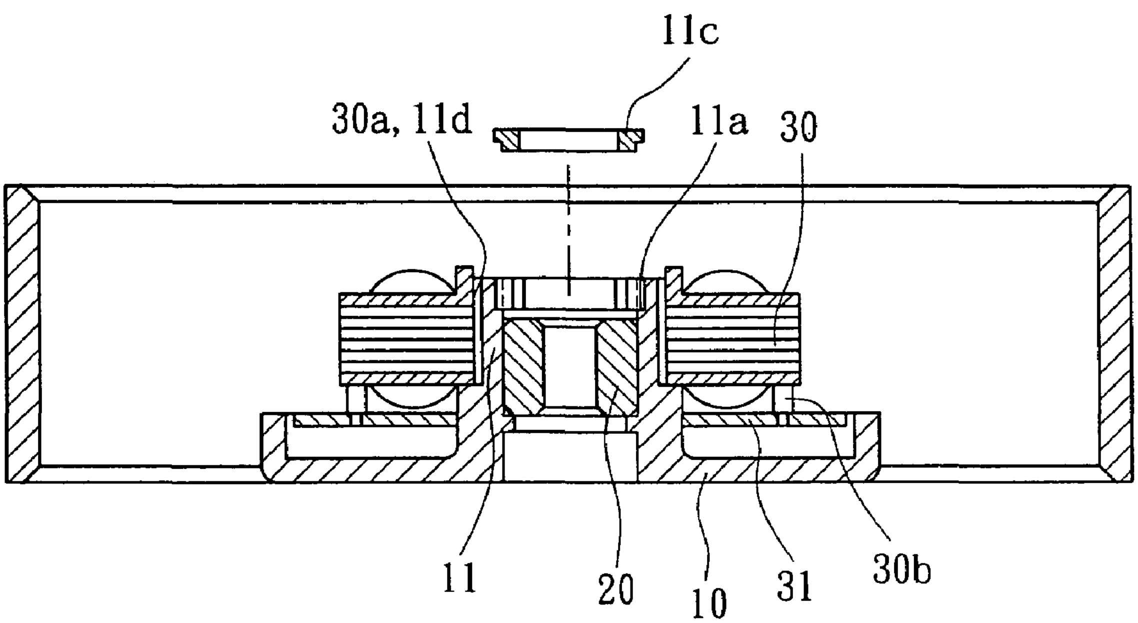
FIG. 2 is a sectional view of the conventional motor in FIG. 1.

Preferred embodiments of the present invention are now to be described hereinafter in detail, in which the same reference numerals are used in the preferred embodiments for the same parts as those in the prior art to avoid redundant description.

Figure 3:
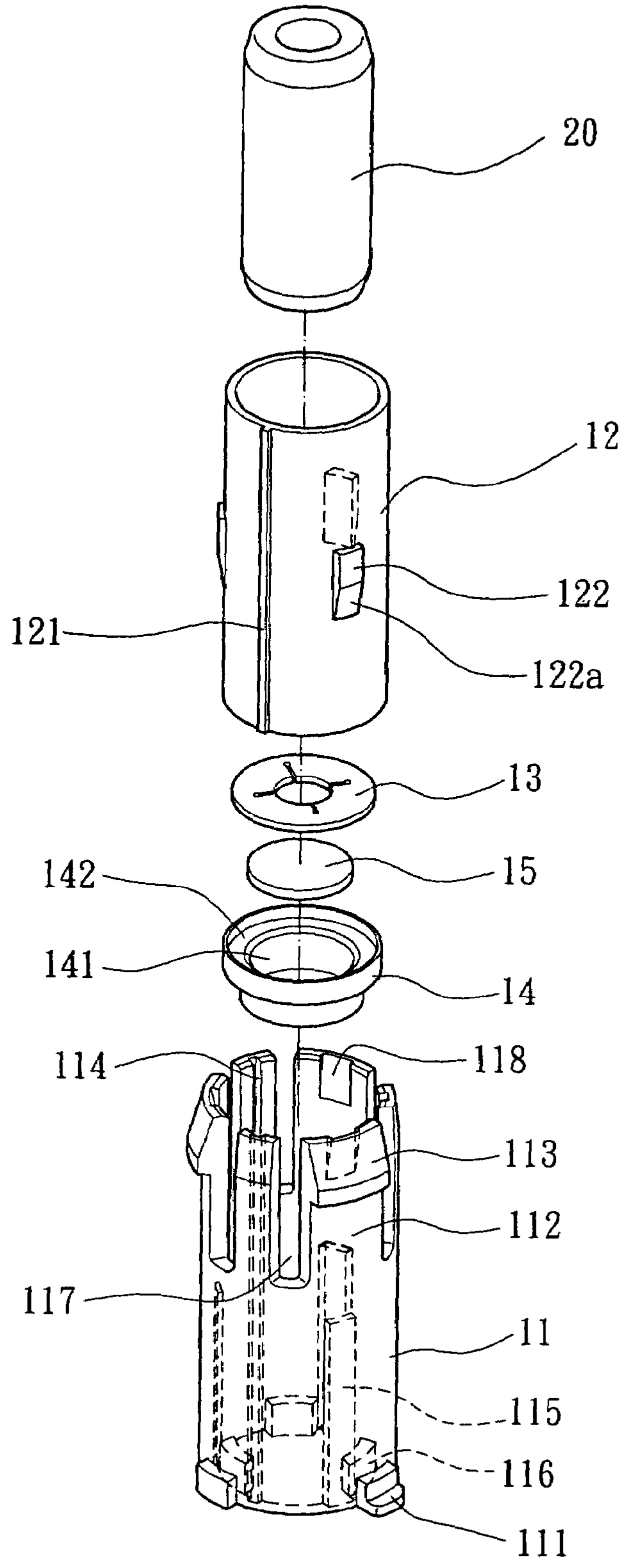
FIG. 3 is an exploded perspective view of a first embodiment of an axial tube assembly for a motor in accordance with the present invention.
Figure 4:
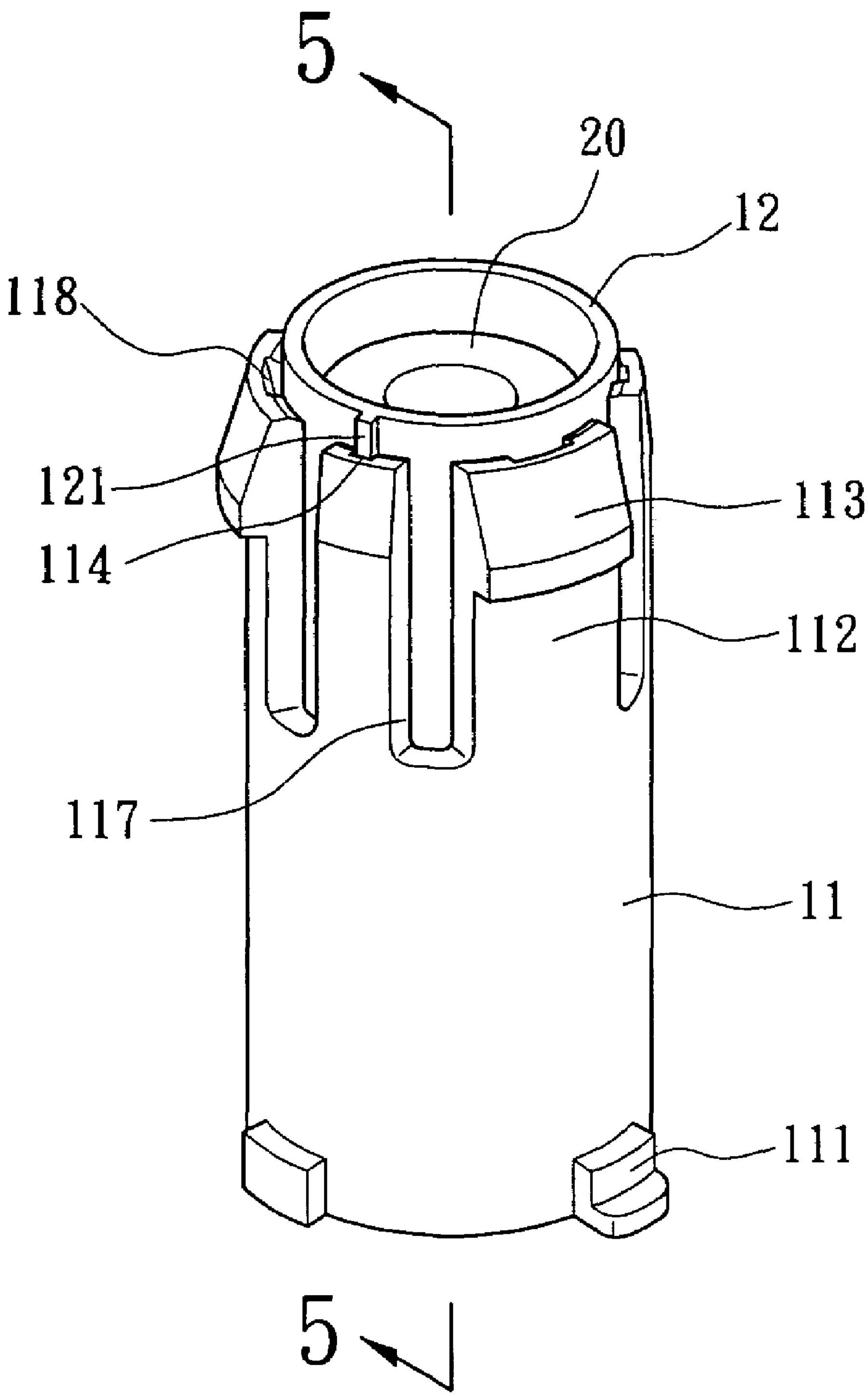
FIG. 4 is a perspective view of the first embodiment of the axial tube assembly for a motor in accordance with the present invention.
Figure 5:
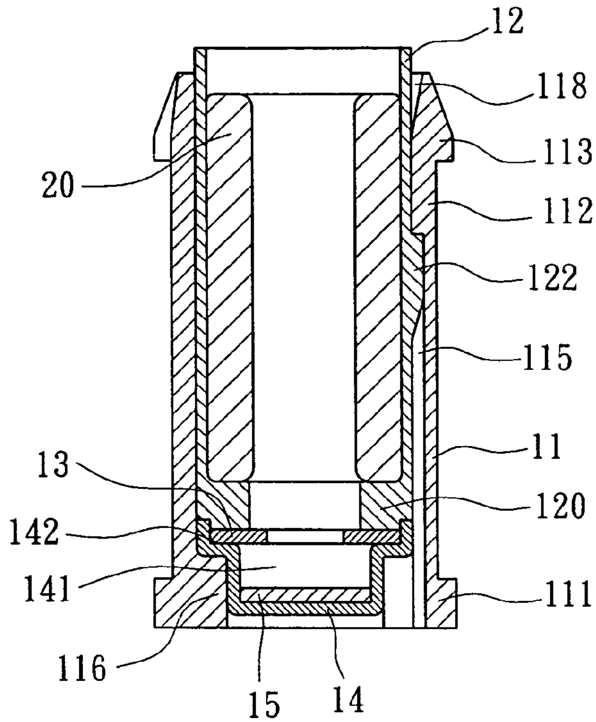
FIG. 5 is a sectional view taken along plane 5—5 in FIG. 4.

Referring to FIGS. 3 through 5, a first embodiment of an axial tube assembly for a motor in accordance with the present invention includes an axial tube 11 and a sleeve 12. The axial tube 11 can be mounted to a casing 10 and engaged with a bearing 20, a stator 30, a circuit board 31, and a rotor 40, thereby forming a motor such as a miniature brushless D.C. motor, as shown in FIG. 6.

The axial tube 11 is preferably made of a plastic material and includes plurality of engaging blocks 111 on a lower end of an outer periphery thereof. A plurality of protrusions 116 are formed on a lower end of an inner periphery of the axial tube 11. Preferably, the protrusions 116 are spaced by regular intervals and symmetrically disposed. Further, a plurality of longitudinal slits 117 are defined in an upper end of the axial tube 11, thereby forming a plurality of resilient tabs 112 on the upper end of the axial tube 11, with each resilient tab 112 having a hook 113 on an outer side thereof. The respective resilient tab 112 possesses required resiliency to move radially inward or outward due to provision of the longitudinal slits 117.

Figure 6:
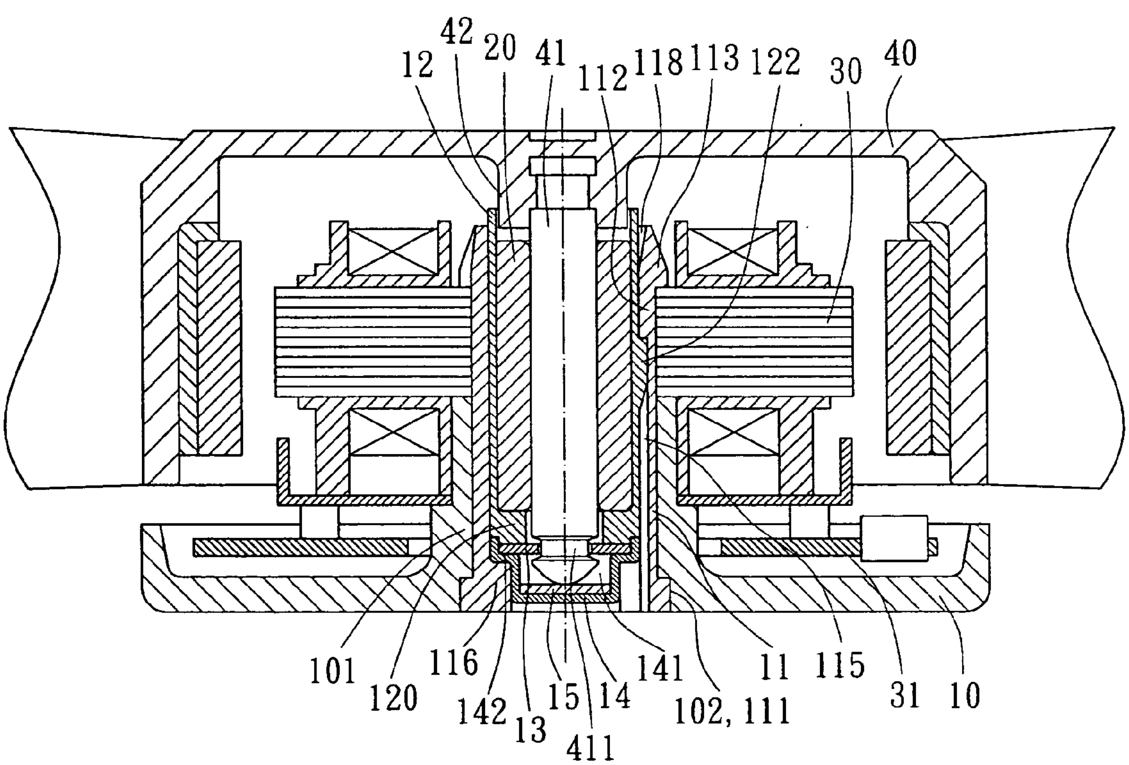
FIG. 6 is a sectional view of a motor with the first embodiment of the axial tube assembly in accordance with the present invention.

As illustrated in FIG. 6, when the axial tube 11 is mounted into a hollow tube 101 on the casing 10, the engaging blocks 111 are respectively and securely engaged in a plurality of engaging grooves 102 defined in a lower end of the hollow tube 101, thereby preventing the axial tube 11 from rotating relative to the casing 10. The respective block 111 and the respective engaging groove 111 may have a corresponding geometric shape, such as elongated or L-shaped.

The axial tube 11 further includes at least one engaging member (e.g., a positioning groove 115) in a lower end of the inner periphery thereof. Further, the axial tube 11 includes at least one guiding groove 118 in an upper end of the inner periphery thereof. The guiding groove 118 is aligned with the positioning groove 115. Further, the axial tube 11 includes at least one longitudinal positioning channel 114 in the inner periphery thereof Preferably, the longitudinal positioning channel 114 is formed between two slits 117 adjacent to each other.

The sleeve 12 is preferably made of a plastic material to form, as shown in FIGS. 3–6, a generally cylindrical structure having an annular wall and includes a bottom end having an inner flange 120.1 the sleeve 12 includes at least one longitudinal rib 121 on an outer periphery thereof. The sleeve 12 further includes at least one engagingmember (e.g., akey 122) formed on the outer periphery thereof. The respective key 122 includes a beveled section 122*a*. When the sleeve 12 is inserted into the axial tube 11, the beveled section 122*a* of the respective key 122 of the sleeve 12 is slidingly guided by the respective groove 118 of the axial tube 11 until the respective key 122 is engaged in the respective positioning groove 115, preventing the sleeve 12 from rotating relative to the axial tube 11. Further, the longitudinal rib 121 of the sleeve 12 is engaged in the longitudinal positioning channel 114 of the axial tube 11, further preventing the sleeve from rotating relative to the axial tube 11.

Still referring to FIGS. 3 through 6, the axial tube assembly may further include a positioning ring 13 engaged in an annular groove 411 in a distal end of a shaft 41 of the rotor 40, thereby preventing the shaft 41 from being disengaged from the bearing 20 along an upward direction. The axial tube assembly may further include a supporting member 14 having a compartment 141 and a stepped portion 142. An abrasion-resisting plate 15 and lubricating oil are received in the compartment 141, and the stepped portion 142 provides a support for the positioning ring 13.

In assembly, the stator 30 and the circuit board 31 that are engaged together are mounted to the hollow tube 101 of the casing 10, and the axial tube 11 is then mounted into the hollow tube 101 from a bottom end of the hollow tube 101. As illustrated in FIG. 6, the respective engaging block 111 of the axial tube 11 is securely engaged in the respective engaging groove 102 of the casing 10, thereby preventing relative rotational movement between the axial tube 11 and the casing 10. Further, the hook 113 on the respective resilient tab 112 is compressed radially inward and passes through the hollow tube 101 and the stator 30. After passing the stator 30, the hook 113 on the respective resilient tab 112 returns to its initial position by the resiliency of the respective resilient tab 112, with the hook 113 on the respective resilient tab 112 being engaged with an end edge delimiting a longitudinal hole (not labeled) of the stator 30. The stator 30 and the circuit board 31 are thus retained in place.

Next, the positioning ring 13, the supporting member 14, and the abrasion-resisting plate 15 are mounted into the axial tube 11. The bearing 20 is then mounted into the sleeve 12, which, in turn, is inserted into and thus tightly engaged in the axial tube 11. As best illustrated in FIGS. 5 and 6, the annular wall of the sleeve separates the bearing from the axial tube such that no part of the bearing is in contact with the axial tube. The positioning ring 13, the supporting member 14, and the abrasion-resisting plate 15 are reliably sandwiched between the flange 120 of the sleeve 12 and the protrusions 116 of the axial tube 11. The shaft 41 of the rotor 40 is then extended through the bearing 20 and the positioning ring 13, with the distal end of the shaft 14 resting on the abrasion-resisting plate 15, which, in turn, is supported by a bottom end of the supporting member 14. It is noted that the positioning ring 13 is engaged in the annular groove 411 in the distal end of the shaft 41 in a manner not adversely affecting rotation of the shaft 41, which is conventional and therefore not described in detail. Further, the longitudinal rib 121 of the sleeve 12 is engaged in the longitudinal positioning channel 114 of the axial tube 11, and the respective key 122 of the sleeve 12 is engaged in the respective positioning groove 115 of the axial tube 11, preventing the sleeve 12 from rotating relative to the axial tube 11.

As illustrated in FIG. 6, since the sleeve 12 and the axial tube 11 exert forces to each other, the sleeve 12 is tightly engaged with the bearing 20 and thus retains the bearing 20 in place. The respective resilient tab 112 of the axial tube 11 expands radially outward and is thus securely engaged with the stator 30. The stator 30 is thus reliably positioned. Further, since the sleeve 12 and the axial tube 11 are reliably engaged together, disengagement of the sleeve 12, the positioning ring 13, the supporting member 14, and the abrasion-resisting plate 15 from the axial tube 11 along an upward direction is avoided. Thus, the assembling reliability and stability of the bearing 20 and the stator 30 are improved. As a result, the rotational stability of the rotor 40 is improved, and generation of noise resulting from imbalanced rotation of the rotor 40 is avoided.

Further, as illustrated in FIG. 6, an upper end of the sleeve 12 may extend upward to a position adjacent to a hub 42 of the rotor 40 to which the other end of the shaft 41 is mounted. This reduces the gap between the sleeve 12 and the rotor 40, avoiding entrance of dusts into the bearing 20. The life of the bearing 20 is thus prolonged. The bearing 20 may be an oily bearing, self-lubricating bearing, copper bearing, or sintered bearing. The compartment 141 may receive lubricating oil for prolonging the life of the bearing 20.

Figure 7:
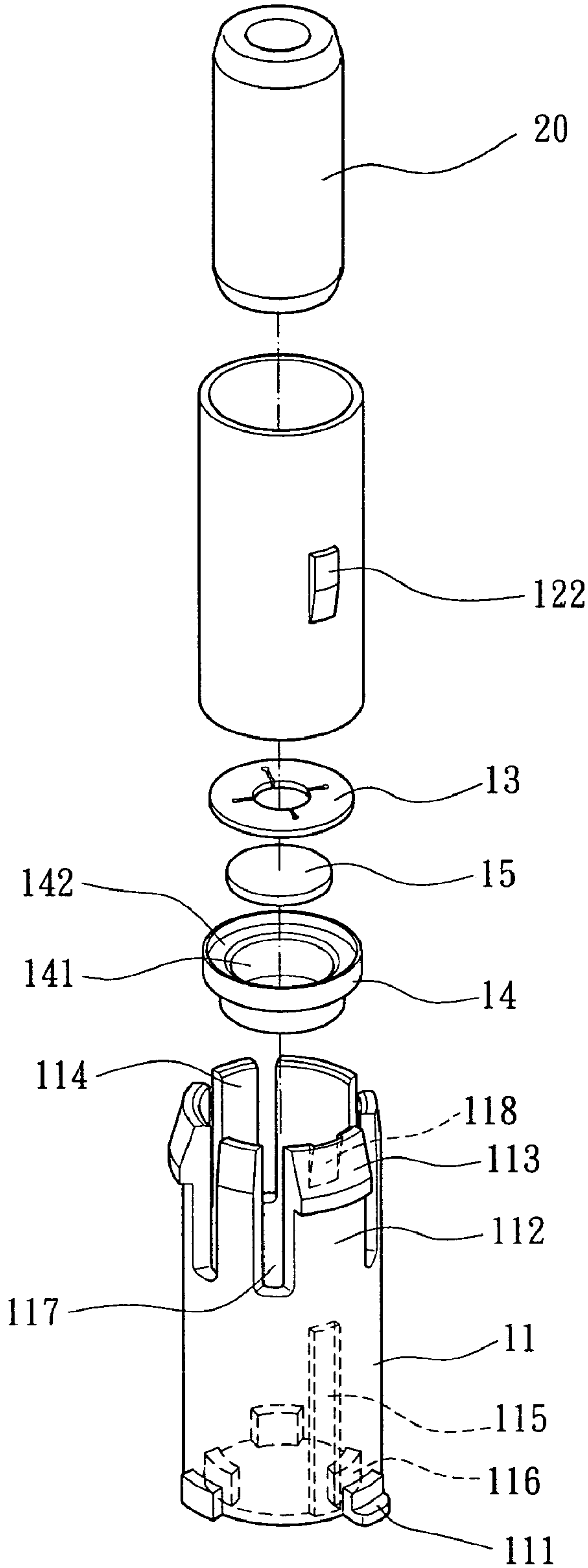
FIG. 7 is an exploded perspective view of a second embodiment of the axial tube assembly for a motor in accordance with the present invention.

FIG. 7 illustrates a second embodiment of the invention modified from the first embodiment, wherein the longitudinal rib 121 of the sleeve 12 and the longitudinal positioning channel 114 of the axial tube 11 are omitted. Further, there is only one key 122 on the sleeve 12 and only one positioning groove 115 in the axial tube 11. Since the key 122 of the sleeve 12 is engaged in the positioning groove 115 of the axial tube 11, disengagement of the sleeve 12, the positioning ring 13, the supporting member 14, and the abrasion-resisting plate 15 from the axial tube 11 along an upward direction is avoided.

Figure 8:
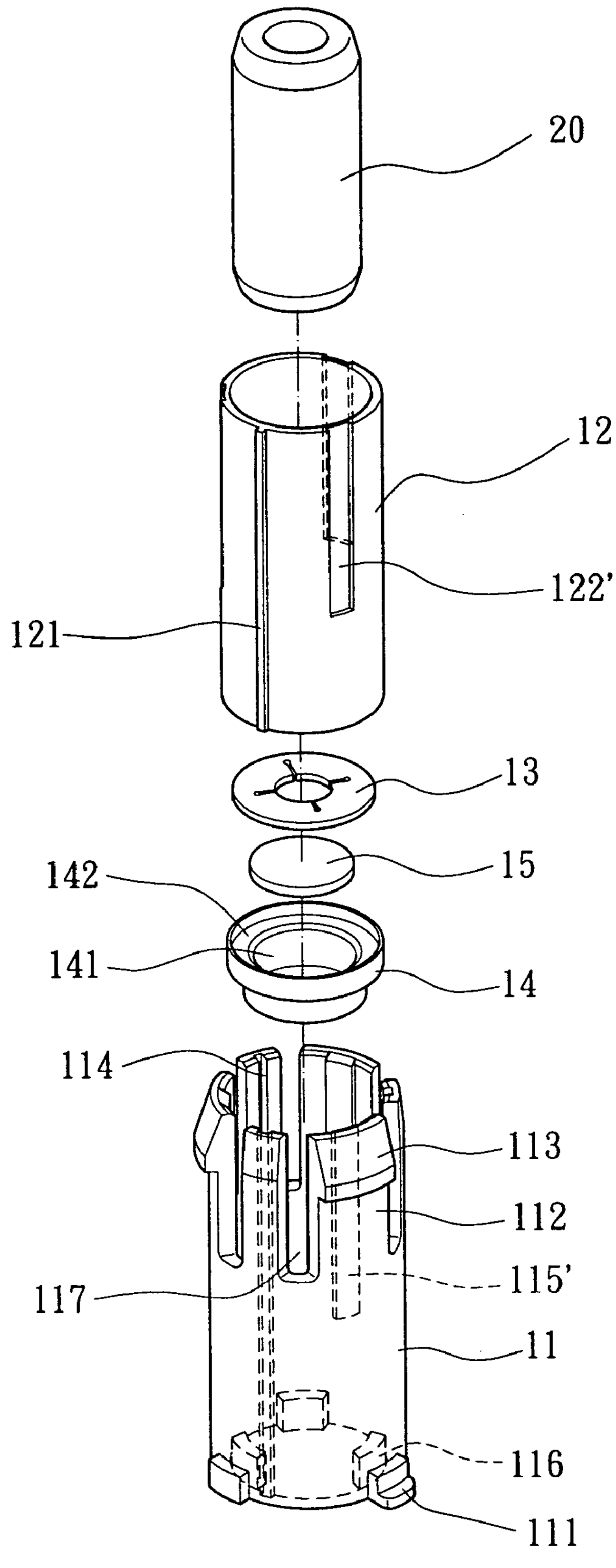
FIG. 8 is an exploded perspective view of a third embodiment of the axial tube assembly for a motor in accordance with the present invention.
Figure 9:
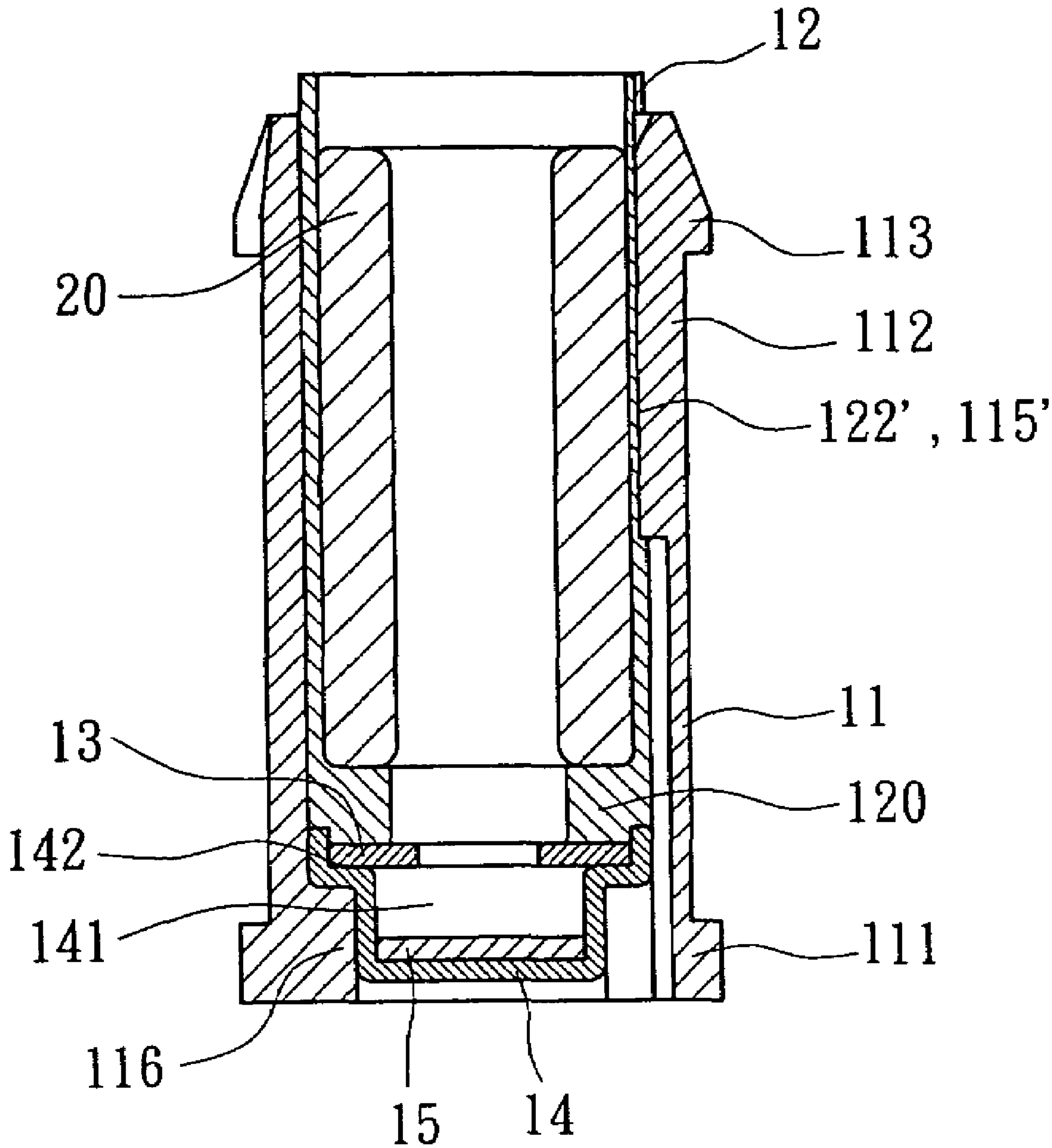
FIG. 9 is a sectional view of the third embodiment of the axial tube assembly for a motor in accordance with the present invention.
Figure 10:
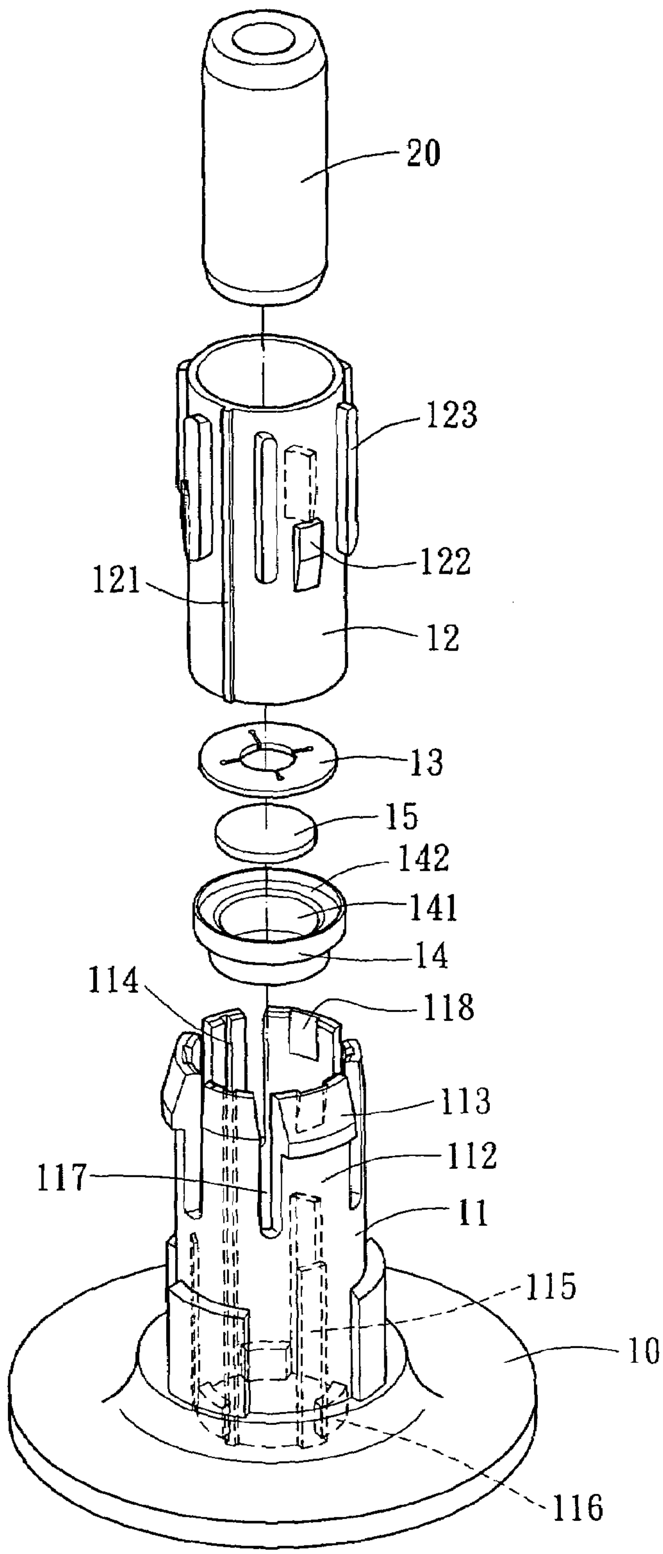
FIG. 10 is an exploded perspective view of a fourth embodiment of the axial tube assembly for a motor in accordance with the present invention.
Figure 11:
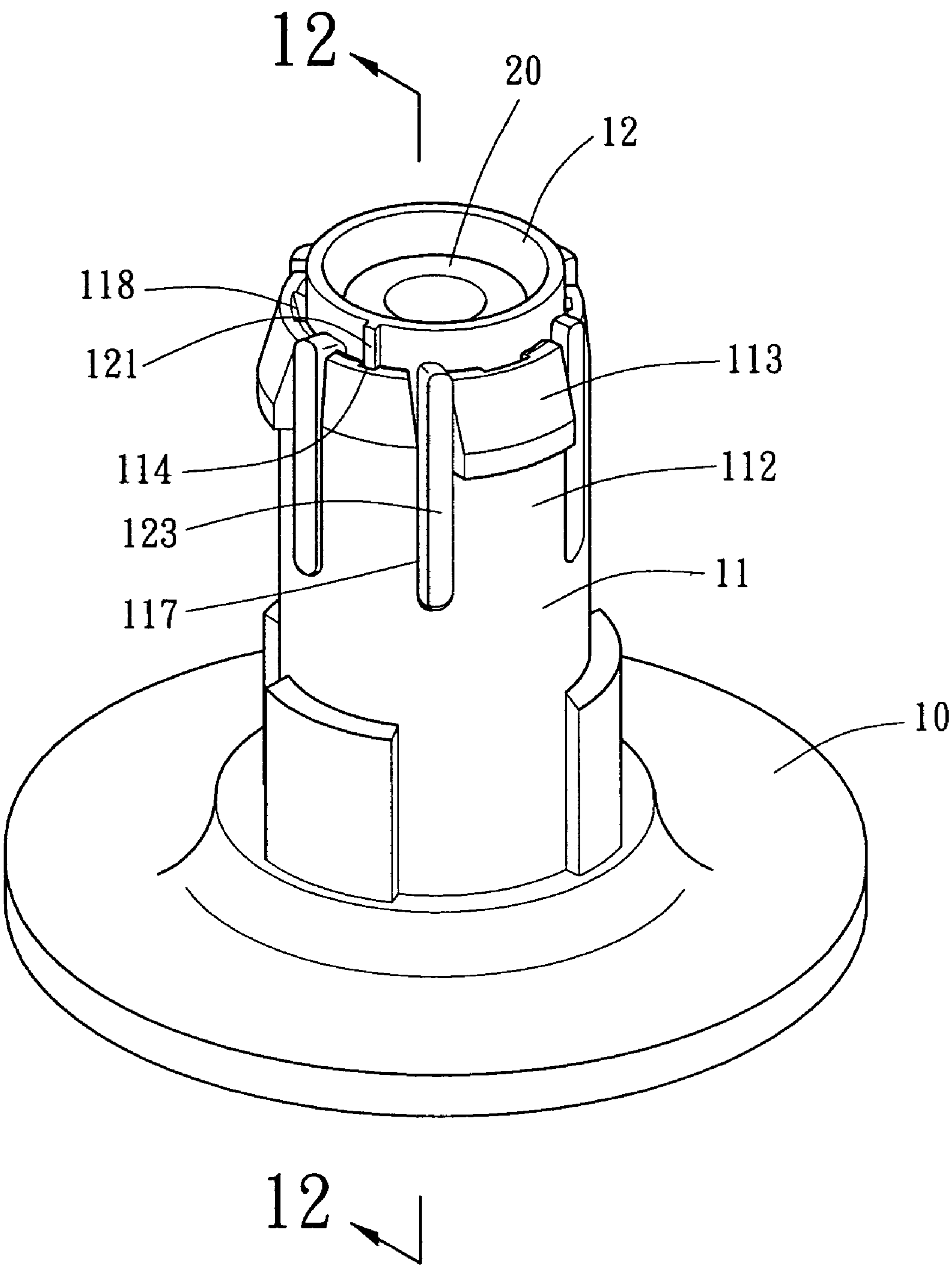
FIG. 11 is a perspective view of the fourth embodiment of the axial tube assembly for a motor in accordance with the present invention.
Figure 12:
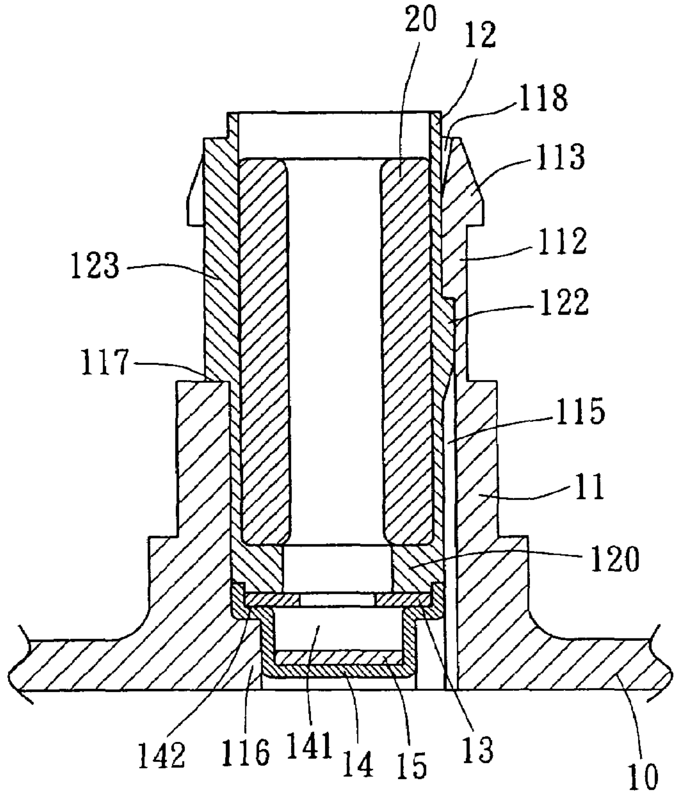
FIG. 12 is a sectional view taken along plane 12—12 in FIG. 11.
Figure 13:
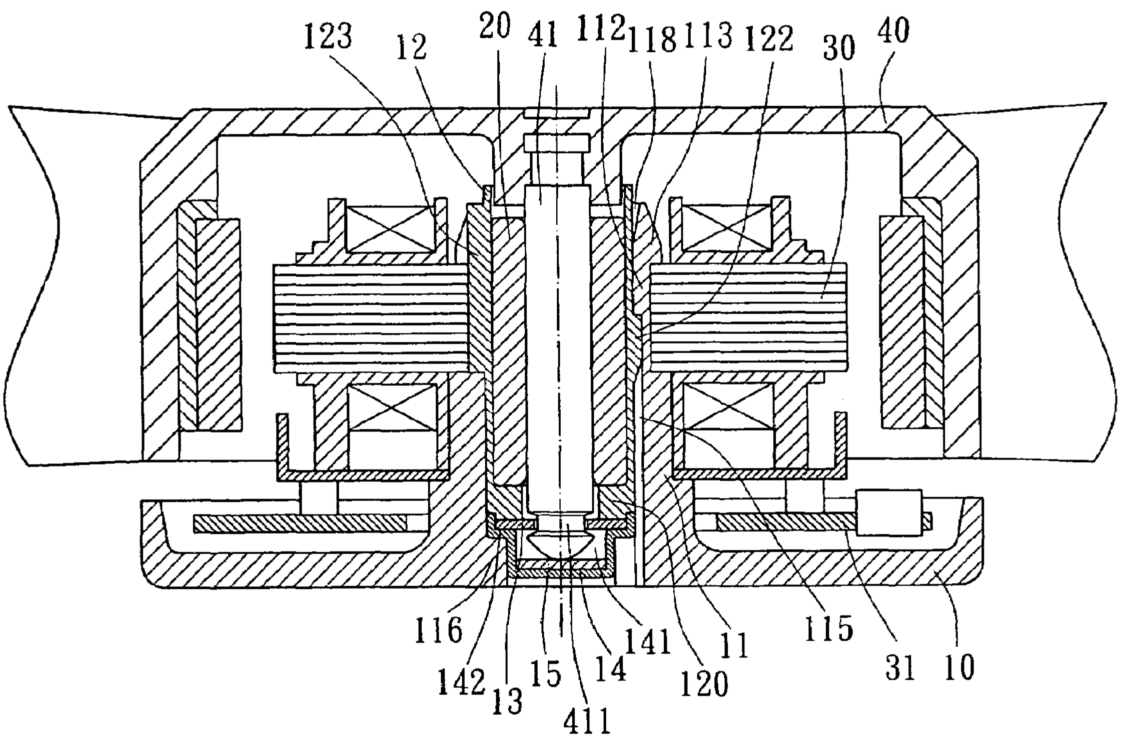
FIG. 13 is a sectional view of a motor with the fourth embodiment of the axial tube assembly in accordance with the present invention.

FIGS. 8 and 9 illustrate a third embodiment of the invention modified from the first embodiment, wherein the respective engaging member of the axial tube 11 is an elongated key 115' on the upper end of the inner periphery of the axial tube 11, and the respective engaging member of the sleeve 12 is a positioning groove 122' in the outer periphery of the sleeve 12. Further, the guiding grooves 118 of the axial tube 11 are omitted. Since the respective key 115' of the axial tube 11 is engaged in the respective positioning groove 122' of the sleeve 12, disengagement of the sleeve 12, the positioning ring 13, the supporting member 14, and the abrasion-resisting plate 15 from the axial tube 11 along an upward direction is avoided.

FIGS. 10 through 13 illustrate a fourth embodiment of the invention modified from the first embodiment, wherein the axial tube 11 in this embodiment is directly integrally formed on the casing 10 to reduce the number of elements without adversely affecting the tight engagement between the axial tube 11 and the sleeve 12. Further, the sleeve 12 includes a plurality of positioning blocks 123 on the outer periphery thereof, with each positioning block 123 being engaged in the respective longitudinal slit 117 of the axial tube 11, thereby improving engaging reliability among the axial tube 11, the sleeve 12, and the bearing 120.

Figure 14:
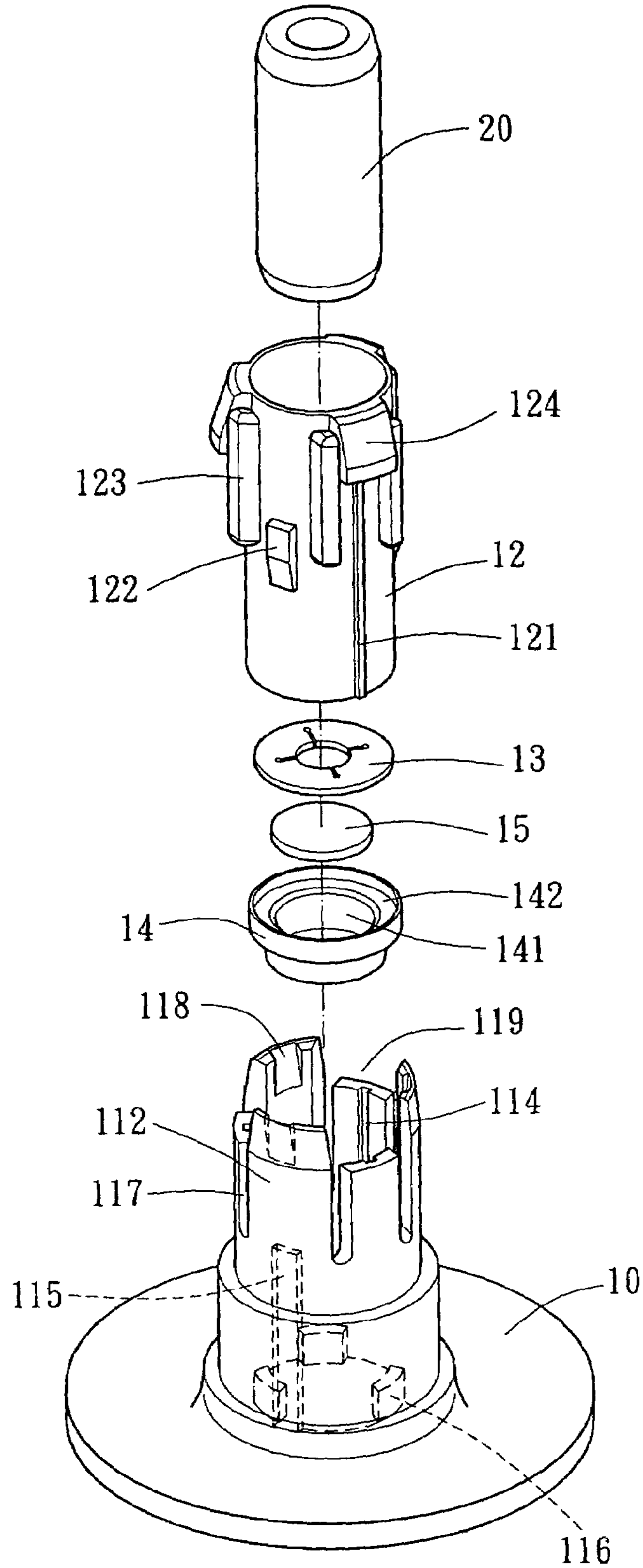
FIG. 14 is an exploded perspective view of a fifth embodiment of the axial tube assembly for a motor in accordance with the present invention.
Figure 15:
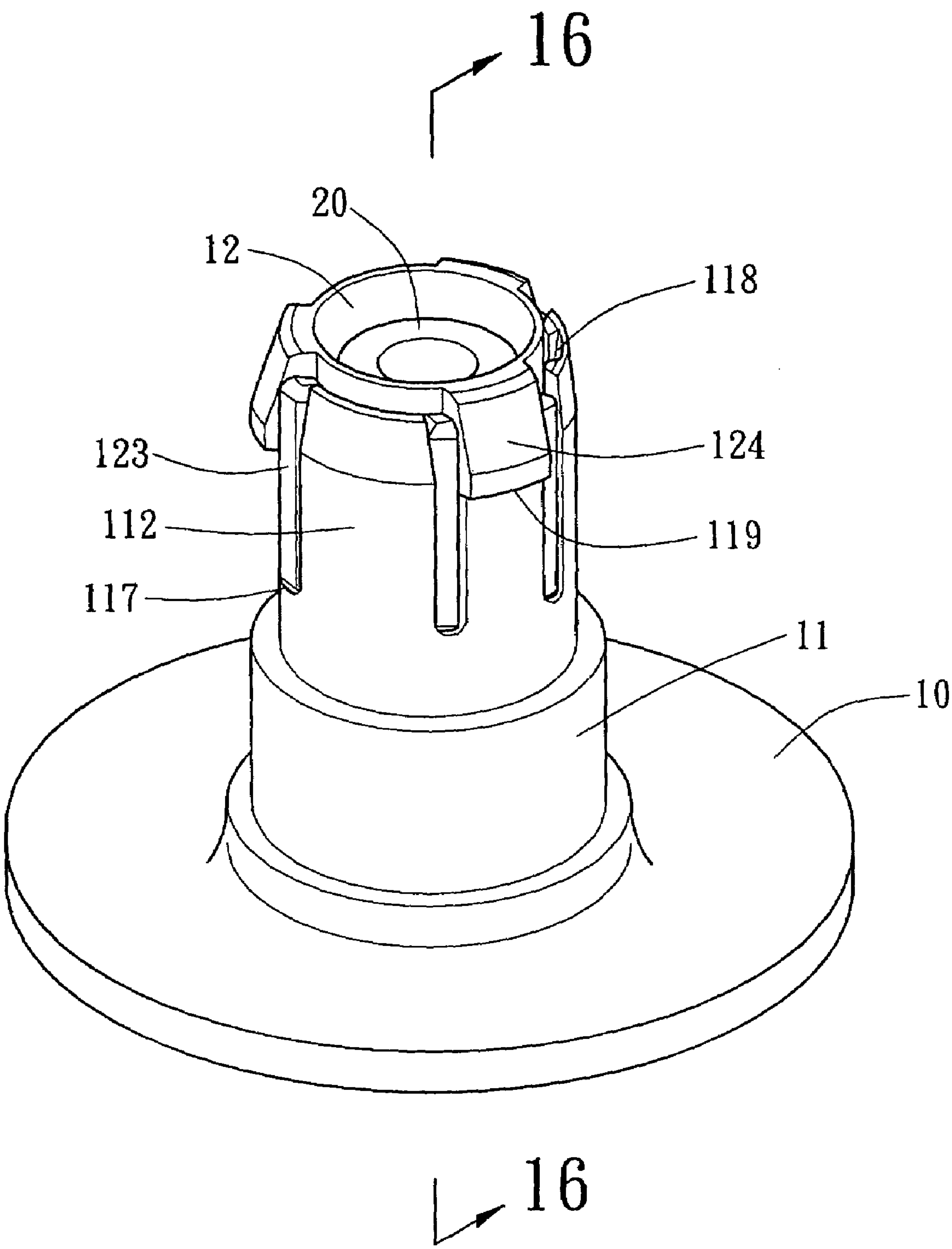
FIG. 15 is a perspective view of the fifth embodiment of the axial tube assembly for a motor in accordance with the present invention.
Figure 16:
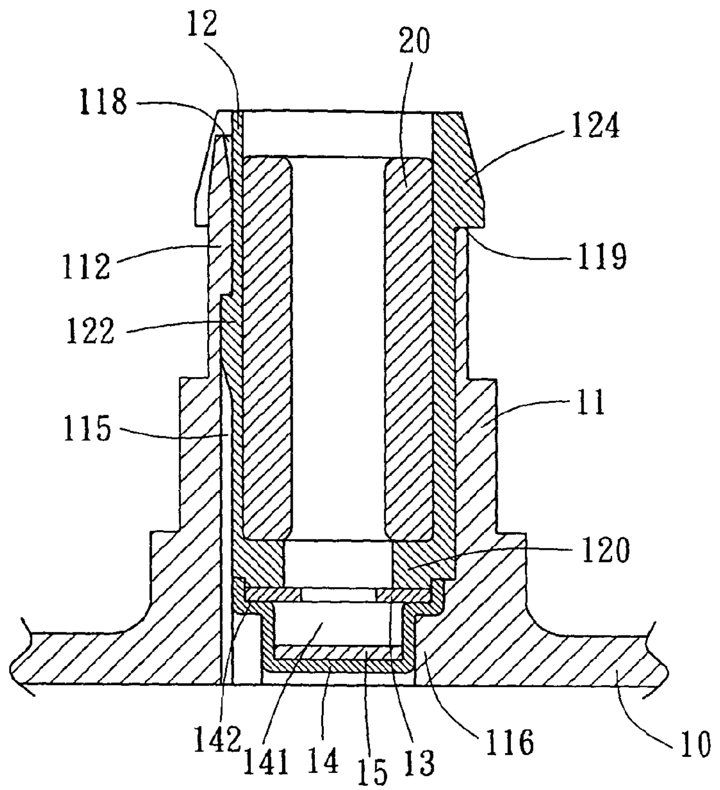
FIG. 16 is a sectional view taken along plane 16—16 in FIG. 15.
Figure 17:
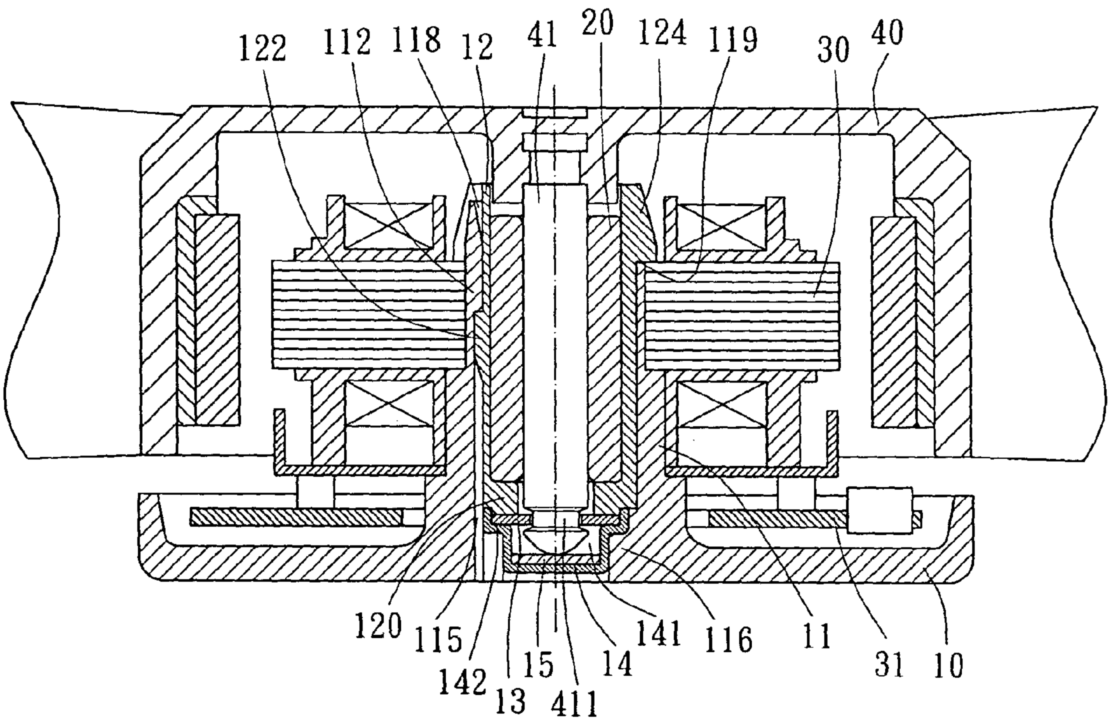
FIG. 17 is a sectional view of a motor with the fifth embodiment of the axial tube assembly in accordance with the present invention.

FIGS. 14 and 17 illustrate a fifth embodiment of the invention modified from the fourth embodiment, wherein the hook 113 on the respective resilient tab 112 of the axial tube 11 is omitted, and the sleeve 12 includes a plurality of hooks 124 formed on an upper end of the outer periphery thereof. Further, some of the resilient tabs 112 have a relatively smaller length (compared to the remaining resilient tabs 112) to provide a plurality of receiving spaces 119 for receiving the hooks 124 of the sleeve 12. The stator 30 is retained in place by the hooks 124 on the sleeve 12 after assembly. Again, since the respective key 122 of the sleeve 12 is engaged in the respective positioning groove 115 of the axial tube 11, disengagement of the sleeve 12, the positioning ring 13, the supporting member 14, and the abrasion-resisting plate 15 from the axial tube 11 along an upward direction is avoided.

While the principles of this invention have been disclosed in connection with specific embodiments, it should be understood by those skilled in the art that these descriptions are not intended to limit the scope of the invention, and that any modification and variation without departing the spirit of the invention is intended to be covered by the scope of this invention defined only by the appended claims.

What is claimed is:

1. An axial tube assembly for a motor, comprising:

an axial tube adapted to be securely mounted to a casing, with a stator being adapted to be mounted to the axial tube, the axial tube including at least one first engaging member on an inner periphery thereof; and a sleeve mounted in the axial tube, with a bearing being adapted to be mounted in the sleeve, the sleeve including an annular wall and at least one second engaging member engaged with said at least one first engaging member of the axial tube, said annular wall of the sleeve separating the bearing from the axial tube such that no part of the bearing is in contact with the axial tube;

wherein the sleeve is tightly engaged with the axial tube such that the axial tube and the bearing exert forces to on each other to thereby retain the axial tube and the bearing in place.

2. The axial tube assembly as claimed in claim 1, wherein the axial tube includes a plurality of longitudinal slits in an upper end thereof, thereby forming a plurality of resilient tabs.

3. The axial tube assembly as claimed in claim 2, wherein each said resilient tube has a hook on an outer side thereof.

4. A motor comprising:

a casing;

an axial tube securely mounted to the casing, the axial tube including at least one first engaging member on an inner periphery thereof;

a stator mounted to the axial tube;

a sleeve mounted in the axial tube, the sleeve including an annular wall and at least one second engaging member engaged with said at least one first engaging member of the axial tube; and a bearing mounted in the sleeve, said annular wall of the sleeve separating the bearing from the axial tube such that no part of the bearing is in contact with the axial tube;

the sleeve being tightly engaged with the axial tube such that the axial tube and the bearing exert forces on each other to thereby retain the axial tube and the bearing in place.

5. The axial tube assembly as claimed in claim 4, wherein the casing includes a hollow tube in which the axial tube is mounted.

6. The axial tube assembly as claimed in claim 5, wherein the axial tube includes a plurality of engaging blocks on a lower end of an outer periphery thereof, the hollow tube of the casing including a plurality of engaging grooves in a lower end thereof for respectively and securely receiving the engaging blocks of the axial tube, thereby preventing the axial tube from rotating relative to the casing.

7. The axial tube assembly as claimed in claim 4, further including a rotor having a shaft rotatably received in the bearing.

8. The axial tube assembly as claimed in claim 7, wherein the rotor includes a hub to which an end of the shaft is securely mounted, the sleeve including an upper end in a position adjacent to the hub, preventing dust from entering the bearing.

9. The axial tube assembly as claimed in claim 7, wherein the axial tube includes a plurality of protrusions formed on an inner periphery thereof, further including a positioning ring sandwiched between the protrusions of the axial sleeve and a bottom end of the sleeve, with the shaft being rotatably held by the positioning ring.

10. The axial tube assembly as claimed in claim 1, wherein said axial tube includes at least one longitudinal positioning channel in the inner periphery thereof, and said sleeve includes at least one longitudinal rib on an outer periphery thereof, and said longitudinal rib is engaged in said longitudinal positioning channel when assembled.

11. The axial tube assembly as claimed in claim 4, wherein said axial tube includes at least one longitudinal positioning channel in the inner periphery thereof, and said sleeve includes at least one longitudinal rib on an outer periphery thereof, and said longitudinal rib is engaged in said longitudinal positioning channel when assembled.

* * * * *